March 31, 1942.  N. PERINELLI  2,278,117
MOLE TRAP
Filed March 18, 1941
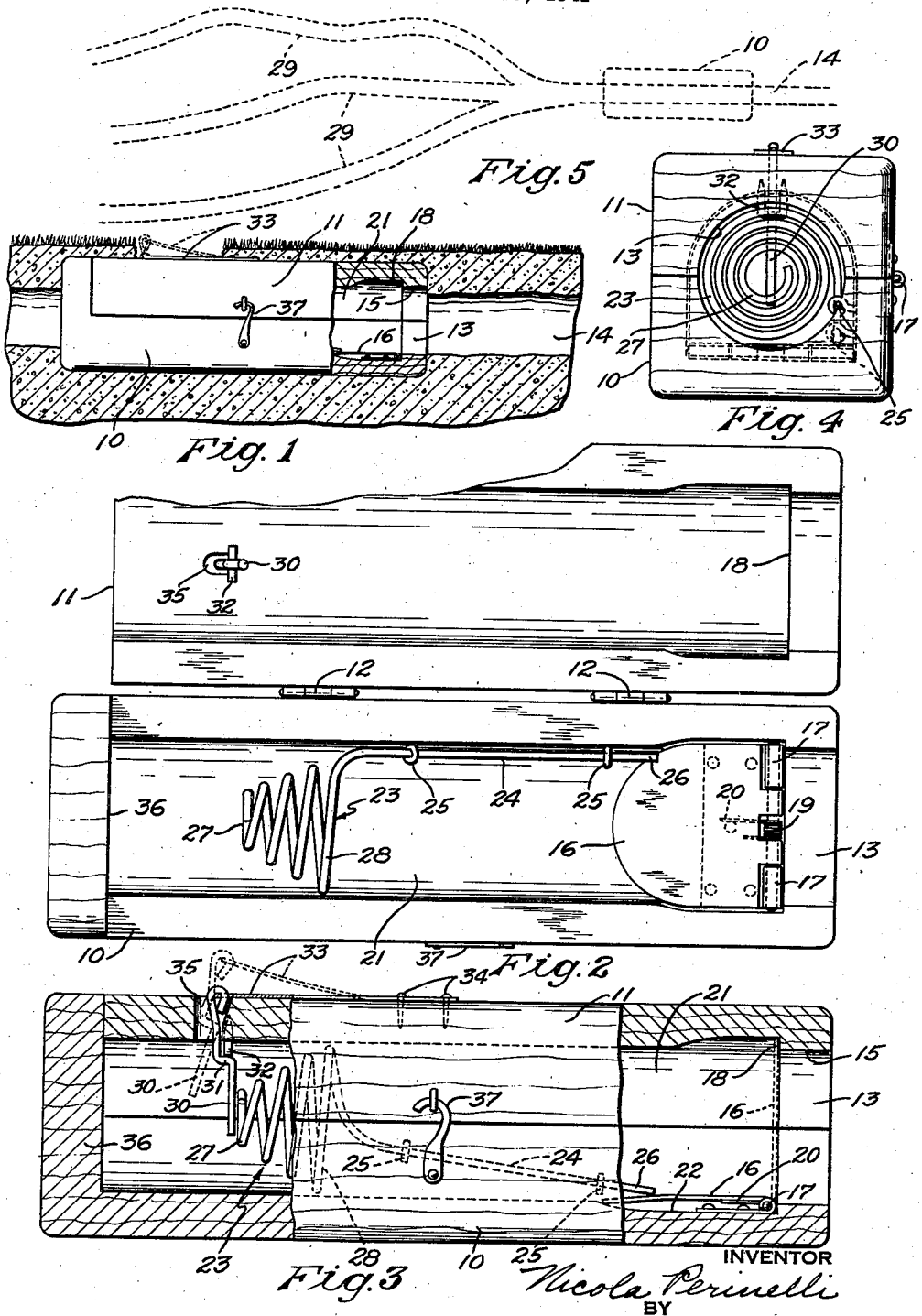
INVENTOR
Nicola Perinelli
BY
Wooster & Davis
ATTORNEYS Patented Mar. 31, 1942

2,278,117

UNITED STATES PATENT OFFICE 2,278,117

MOLE TRAP

Nicola Perinelli, White Plains, N. Y.

Application March 18, 1941, Serial No. 383,896

4 Claims. (Cl. 43—61)

This invention relates to an animal trap, particularly a trap for catching moles, and has for an object to provide an improved trap for this purpose which may be easily placed in the burrow and will be effective in catching the mole as it passes along the main burrow from its nest to the working or feeding area.

It is also an object of the invention to provide an improved releasing or tripping mechanism which is so constructed and arranged as to be operated by pressure of the front feet of the mole before any part thereof is contacted by its sensitive nose to thus warn it and cause it to back out without tripping the trap.

With the foregoing and other objects in view I have devised the construction illustrated in the accompanying drawing forming a part of this specification. It however is to be understood that I am not limited to the specific construction and arrangement shown but may employ various changes and modifications within the scope of the invention.

In this drawing:

Fig. 1 is a partial side elevation and partial vertical section showing the trap in position in the burrow of a mole;

Fig. 2 is a top plan view on a larger scale with the cover section raised or open;

Fig. 3 is a partial side elevation and partial vertical section showing the parts in the position they occupy when the trap is set;

Fig. 4 is an end view looking from the right of Fig. 3; and

Fig. 5 is a diagrammatical view showing how the trap may be used.

The trap comprises a box or body of wood or other suitable material including a base portion 10 and a cover 11 hinged together at one side by hinges 12. At one end is an entrance opening 13, and the trap when in use is placed in the main portion or run 14 of the mole's burrow or tunnel, as indicated in Figs. 1 and 5, with this opening 13 in alignment with the burrow or tunnel 14. It should be placed with the lower side or edge of the opening substantially even or level with the bottom of the burrow, and the top 15 should be at least as high as the burrow and preferably somewhat higher as shown in Fig. 1, so that the mole in passing along the burrow will clear the sides of the opening. In other words the opening is preferably somewhat larger than the burrow so as not to interfere in any way with entrance of the mole into the trap.

Adjacent the entrance opening 13 is a closure tending to move toward closed position across the opening. This may be arranged in various ways, but is preferably a sheet metal closure or gate 16 hinged at the lower side of the opening 13 as indicated at 17, and at the inward side of the opening is a shoulder 18 to limit its movement and prevent further movement after it comes to a position across the opening. A spring is provided tending to swing this closure to the closed or upright position. This spring may be of various types, but in the present instance is shown as a coiled spring 19 on the hinge pin with one free end 20 engaging the under side of the closure and tending to swing it upwardly to the closed position. Other types of spring may be used as desired, as for example a flat spring under the closure. The box or body forms a compartment 21 to which the opening 13 leads, and the bottom or lower wall of this compartment is recessed as shown at 22 so that when the closure or gate 16 is in the set or open position it is slightly below or substantially even with the bottom wall of the opening 13. The upright or closed position of the closure is indicated in dotted lines Fig. 3.

Forwardly in the interior of the compartment 21 is a trigger comprising a wire loop 23 and a stem 24 mounted to slide in guides 25 arranged so that the free end 26 can rest over the edge of the closure 16 and hold this closure in the lower or set position. The stem 24 and the guides 25 are preferably arranged on the side wall of the compartment so that they are not in the way of the animal entering the compartment and danger of its contacting them and being warned so as to back out of the compartment without releasing the closure is reduced to a minimum.

The loop 23 is of special construction. As shown it is of general and substantially cone-shape with a small or apex end 27 spaced forwardly of the base or larger end 28 and with the convolutions between the two growing gradually smaller toward the apex. The larger or base end is substantially the size of the compartment 21 and the loop is located with its axis horizontal so that it extends across the compartment in an upright position with its larger or base portion 28 facing the entrance opening 13. As the mole comes along the tunnel or burrow 14 from its nest on its way to the working and feeding area 29 it passes through the opening 13 into the compartment or chamber 21 and pushes with its front feet against the larger loop 28 or those immediately in front of this larger loop which pushes loop 23 forwardly and carries the free end 26 from the closure 16, permitting the spring to raise the closure to close the opening as indicated by the dotted lines Fig. 3. The loop 23 by the peculiar construction shown is made so that the mole will not hit its sensitive nose against it and back out without releasing the trip. That is, this shape of the loop permits the mole to move forwardly far enough without hitting its nose so that it will push on the loop with its front feet and release the trip, but the smaller convolutions will not permit the mole to pass through the loop without tripping it.

In front of the loop 23 is a trigger 30 depending at its lower end to a position in front of the loop as shown in Fig. 3 and having an offset 31 forming a shoulder engaging under another shoulder or abutment 32. This trigger is hung from a flat or similar spring 33 secured to the top of the box as indicated at 34, the trigger passing through a suitable opening 35. When the trap is set the offset 31 is under the abutment 32, the arrangement being such that when the spring 33 is depressed the trigger 30 swings by gravity to this position with its depending lower end lying in front of the forward end of the loop 23, and it will be held in this position by frictional pressure between the abutments 31 and 32 under action of the spring 33. When the loop 23 is forced forwardly by the animal in releasing the closure 16 this loop also moves the lower end of the trigger 30 forwardly releasing it from the abutment 32 and permitting the spring 33 to move upwardly to the dotted line position. When the trap is set as shown in Fig. 1 it is left with this spring exposed at the top of the soil so that one may tell at a glance whether the trap has been sprung without the necessity of digging the trap up out of the ground. The opposite end of the compartment of the body is closed as indicated by the wall 36. Any suitable catch 37 may be provided to retain the cover in closed position.

In use the trap is placed as indicated in the main line 14 of the burrow leading from the mole's nest in a stone wall or at the edge of the field to the working or feeding area 29. Moles work only at certain periods of the day, these being usually about from 7 to 7:30 and from 11 to 11:30 in the morning, from about 4:30 to 5 in the afternoon, and 6 to 6:30 in the evening. The trap therefore may be set just before any one of these periods. The bottom of the entrance opening 13 of the trap must be clean and substantially level with the bottom of the burrow or tunnel in the ground, and it will be seen that with the arrangement shown everything is free and open and there is nothing to interfere with the entrance of the animal into the compartment 21. After it passes well beyond the closure 16 it engages the loop 23 with its front feet and pushing on it will release the closure. It will be seen there is nothing against which the mole may contact its sensitive nose before doing this so as to warn it and cause it to back out of the trap without tripping it, but still the loop 23 is such that the mole cannot pass through it without tripping the trap. If the spring or indicator 23 is seen to be in the upper position the trap is taken up and the animal disposed of in any way desired.

Having thus set forth the nature of my invention what I claim is:

1. A mole trap of the character described comprising a body forming a compartment open at one end and closed at the other, a closure adjacent the open end tending to move to closed position over the opening, a trigger for holding the closure in open position, and means in the compartment for shifting the trigger to release the closure comprising a substantially conical wire spiral in an upright position across the path of a mole after it enters the compartment and arranged with the base and larger portion of the spiral facing said entrance opening and of a diameter substantially that of the compartment, said base and spiral being larger than the head of a normal sized mole both in length and diameter so the head can freely enter the spiral without the spiral being contacted by the tender nose of the mole and the base of the spiral being of a size smaller than the spread of the strong fossorial forefeet of the mole so as to be engaged by these feet to shift the spiral to release the trigger before the nose contacts the central portion of the spiral.

2. A trap of the character described comprising a body forming a compartment open at one end and closed at the other, a closure adjacent the open end tending to move to closed position over the opening, a trigger for holding the closure in open position, and means in the compartment for shifting the trigger to release the closure comprising a substantially conical wire spiral across the path of an animal after it enters the compartment and arranged with the base and larger portion of the spiral facing said entrance opening, a spring operated tell tale on the top of said body, means for retaining the tell tale in depressed position, and means operated by shifting of said spiral to release said tell tale.

3. A trap of the character described comprising a body forming a compartment open at one end and closed at the other, a closure adjacent the open end tending to move to closed position over the opening, a trigger for holding the closure in open position, and means in the compartment for shifting the trigger to release the closure comprising a spiral upright loop across the path of an animal after it enters the compartment and having its central portion forwardly of the outer side portions so that the animal will push forwardly on the side portions with his front feet before contacting the central portion with his nose, a spring operated tell tale on top of the body tending to move to a raised position, a wire depending from the tell tale having an offset forming a shoulder, an abutment to be engaged by said shoulder to retain the tell tale in depressed position, and an extension on said depending wire in position to be engaged by said loop when shifted to release the offset from said abutment.

4. A trap of the character described comprising a body forming a compartment open at one end and closed at the other, a closure adjacent the open end tending to move to closed position over the opening, a trigger for holding the closure in open position, and means in the compartment for shifting the trigger to release the closure comprising an upright contact member extending across the path of an animal after it enters the compartment, a spring operated tell tale on top of the body tending to move to a raised position, a wire depending from the tell tale having an offset forming a shoulder, an abutment to be engaged by said shoulder to retain the tell tale in depressed position, and means operated by the shifting of said contact member in releasing the closure to shift said shoulder from the abutment to release the tell tale.

NICOLA PERINELLI.